Figure 6:
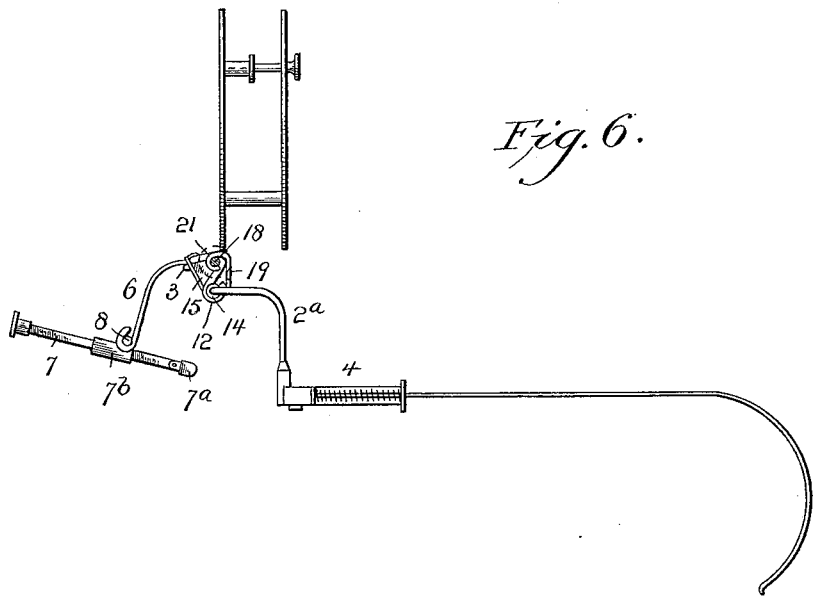

No. 635,443. Patented Oct. 24, 1899.
E. B. MEYROWITZ.
OCULIST'S TESTING FRAME.
(Application filed July 1, 1898.)
(No Model.) 2 Sheets—Sheet 1.
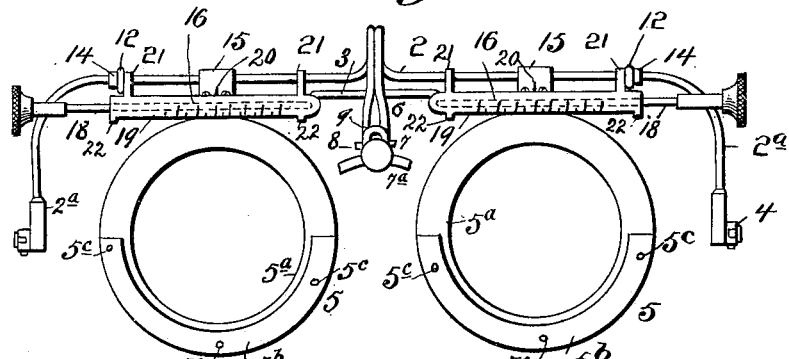
Fig. 1.
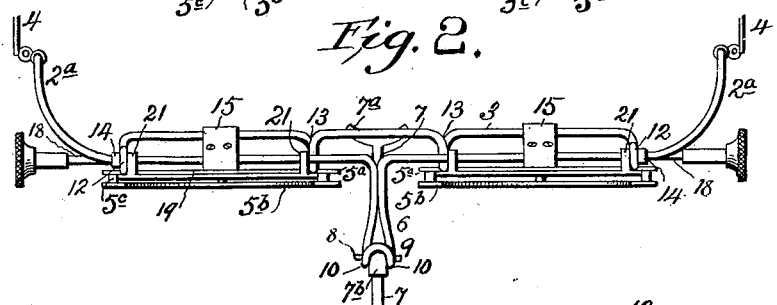
Fig. 2.
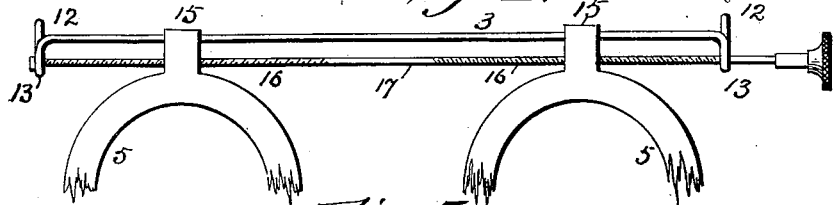
Fig. 3.
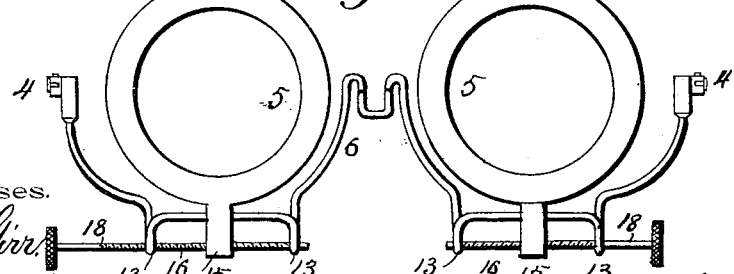
Fig. 4.
Fig. 5.
Witnesses.
J. P. McGinn
G. Davenport.
Inventor.
Emil B. Meyrowitz
by H. A. West
Attorney.
THE NORRIS PETERS CO., PHOTO-LITHO., WASHINGTON, D. C.

No. 635,443. Patented Oct. 24, 1899.
E. B. MEYROWITZ.
OCULIST'S TESTING FRAME.
(Application filed July 1, 1898.)

(No Model.) 2 Sheets—Sheet 2.

WITNESSES:
J. B. McGirr.
A. D. Greenfield

INVENTOR
Emil B. Meyrowitz
BY H. A. West
ATTORNEY

UNITED STATES PATENT OFFICE.

EMIL B. MEYROWITZ, OF RIDGEFIELD, NEW JERSEY.

OCULIST'S TESTING-FRAME.

SPECIFICATION forming part of Letters Patent No. 635,443, dated October 24, 1899.

Application filed July 1, 1898. Serial No. 684,926. (No model.)

*To all whom it may concern:*

Be it known that I, EMIL B. MEYROWITZ, a citizen of the United States, and a resident of Ridgefield, in the county of Bergen and State of New Jersey, have invented certain new and useful Improvements in Oculists' Testing-Frames, of which the following is a specification.

My invention relates to oculists' testing or trial frames; and the object of my invention is to devise a form of construction which shall possess firmness and rigidity among its parts and have advantage in point of cheapness and durability, as well as in facility of use, and allow adjustment or resetting of the bearings to take up wear and to maintain the said desirable firmness and rigidity throughout the life of the frame; and to these ends the invention consists, mainly, of a test-frame wherein the bearings which support the movable parts thereof are formed of loops, bends, or folds made in the material (usually round wire) out of which the fixed or relatively-fixed parts of the frame is or are composed.

The invention also consists in the special construction of the said fixed and relatively-fixed parts of the frame and also in the combination therewith of suitable adjusting and adjustable parts which make up the complete apparatus, all as hereinafter described and claimed.

In the accompanying drawings, to which reference is made and which form a part of this specification, Figure 1 is a front elevation of a testing or trial frame embodying my invention. Fig. 2 is a plan view of the same, the temples being omitted. Fig. 3 is a perspective view of one form of cell-bar embodying my invention. Fig. 4 is a detailed front view showing a modification. Fig. 5 is a similar view showing another modification. Fig. 6 is a sectional side elevation of the test-frame, showing the lens-cells turned upward.

In the drawings, 2 and 3 represent the fixed or relatively-fixed parts of the test-frame. The former, 2, I shall term the "temple-bar," the latter, 3, the "cell-bar." The temple-bar 2 has the temples 4 4 hinged to its ends $2^a$ $2^a$, and these ends are by preference curved backward and downward, as shown in Figs. 1 and 2, so that when the temples are placed upon the ears of a patient the front horizontal portion of the bar will be elevated or held up sufficiently high to bring the centers of the lens-cells 5 5 in front of the pupils of the eyes. At its center the said temple-bar 2 is bent and folded back upon itself to form an intermediate overhanging support or arm 6, in and to which the nose rest or gage 7 is pivoted by or on a pintle or pivot 8. The bearings or supports 9 for the said nose rest or gage 7 in the extension or arm 6 are formed by bending over the end of said arm, thus forming integral with the said arm the loops or stirrups 10 10, which embrace and confine the pintle 8. The nose rest or gage 7 is provided at its inner end with a bridge $7^a$ to make contact with the nose, and in order to properly adjust the frame to anatomically-varying features the said nose rest and gage is adapted to be adjusted longitudinally and vertically—that is, the bridge $7^a$ may be moved back and forth by sliding the gage 7 through a sleeve $7^b$, and said bridge may be raised and lowered by tilting the bar 7 and sleeve $7^b$, as on trunnions held by the intermediate overhang or support 6.

When the temples are placed upon the ears of a patient, the nose rest or gage 7 and bridge $7^a$ are adjusted to the bridge of the patient's nose, so that the testing-frame as a whole is supported by the patient's ears and nose. By sliding the bar 7 in or out the ends $2^a$ $2^a$ and also the temples 4 4 may be moved forward or backward—that is to say, by sliding the bar 7 in or out the arm 6 is carried either away from or nearer to the patient's nose. In this manner the optician is enabled to set or gage the temple-bar 2 and the temples 4 4 to suit the facial formation of the particular patient. This done, the cell-frame is to be adjusted to bring the lens-cells to vertical position in front of the eyes, and then again, if necessary, by pressing in or drawing out the bar 7 the lens-cells may be raised or lowered to bring the centers of the lenses in front of the pupils of the eyes.

The "cell-bar" 3 (so called because the lens-cells 5 5 swing therewith and are mainly supported thereby) is made of wire and is bent to form bearings or holding-loops for connecting it with the temple-bar, on which latter it swings while the temples remain stationary, and also to form one or more bearings or loops to hold screws for adjusting the cells 5 5 laterally to or from each other. 12 12 represent the first-named loops, and 13 13 the last-named loops. The loops 12 12 project upward and are bent around the temple-bar 2 adjacent to and between stops 14 14, which prevent the cell-bar from sliding longitudinally on the temple-bar. The cells 5 5 are provided with lugs 15 15, having two holes or recesses, one to engage with the cell-bar, so that the latter acts as a stay and guide for the cells to slide on, the others screw-threaded to receive adjusting-screws 16 16 for moving the lens-cells to and from each other. The said adjusting-screws may be on a single rod 17, as shown in Fig. 4, one right and the other left, in which case the central loops or bearings 13 13 of the cell-bars shown in Fig. 3 will be omitted, or the adjusting-screws may be on separate and independent rods 18 18, in which case the said central loops or bearings 13 13 will be employed. When the separate screw-rods are employed, the adjacent ends thereof will be held in the central loops or bearings 13 13, while the body of the rods will be held in the loops or bearings at the ends of the cell-rod 3. In this manner the cost of manufacturing a multiplicity of parts and of assembling them by soldering or by means of rivets and screws is entirely obviated, and, furthermore, the whole structure is made firm and rigid, and in case of wear the bearing or loops may be closed down by means of pincers or otherwise to maintain a snug and desirable action among the movable parts.

In the form of construction shown in Figs. 1, 2, 3, and 4 the lens-cells 5 5 are suspended from the temple and cell bars; but in Fig. 5 this arrangement is reversed and the cells are supported from below. In this construction I may dispense with the temple-bar and hold the cells rigidly. This may also be done in the form shown in Figs. 1 and 2, that the swinging adjustment of the cells to and from the eyes may be dispensed with, retaining only the lateral adjustment.

In Fig. 5 the cell-bar 3 has the temples attached to its ends, the latter being upturned for that purpose, and the end loops 12 (shown in Fig. 3) are dispensed with. The four parallel loops or bearings 13 13 are made within the length of the wire to hold adjusting-screws 18 18, and the intermediate support 6 for the nose rest or guard is bent upward from the central portion of the body of the wire, as shown clearly in the drawings, leaving a space to straddle the nose of the patient.

The lens-cells 5 each comprise a ring $5^a$ and a segment of another ring $5^b$. The segment $5^b$ is held a short distance in front of the ring $5^a$ by three posts $5^c$, which support the lens-rim and lenses in proper position in the cells. The inner edge of the segment $5^b$ is struck from a circle whose radius is greater than the radius of the ring $5^a$, so that when a lens-rim and lens is placed in the cell the segment will stand below the circumference of the lens, but not below the circumference of the rim, and hence both thick as well as thin lenses may be used in the cells with equal facility, the rims being of uniform or substantially uniform thickness.

19 19 represent plates, on each of which is marked a scale to indicate in connection with a point or line 20 on the lugs 15 the lateral adjustment of the lens-cells 5. These plates 19, as here shown, are connected to the temple-bar 2 by the small arms 21 21 and to the cell-bar by the opposite arms 22 22, which said arms are bent around the said bars, respectively, or the plates may be secured in place in any other suitable way.

Having thus described my invention, what I claim as new, and desire to secure by Letters Patent, is—

1. A testing or trial frame the body of which is formed of wire bent to form loops lateral to the length of the wire, which loops form journals for the adjustable parts of the testing-frame, substantially as described.

2. In a testing or trial frame, a bar to the ends of which the temples are attached, said bar being bent in the center to form an arm or intermediate support, in combination with a nose rest or gage attached to said arm or support, substantially as described.

3. A testing or trial frame having a longitudinally-adjustable nose rest or gage, held to slide in a sleeve or support pivoted in an intermediate arm attached to the body of the frame, substantially as described.

4. A testing-frame having a temple-bar combined with a cell-bar which rotates on the temple-bar, substantially as described.

5. In a testing-frame a temple-bar, and a cell-bar which rotates on the temple-bar, in combination with a rod having screw-threads thereon, a pair of lens-cells, each provided with a lug having two plain apertures and one screw-threaded aperture therein, one of said plain apertures in each lug being an axis of rotation of the cell-bar on the temple-bar, substantially as described.

6. In a testing or trial frame the temple-frame having a front central projecture of wire bent or folded to form bearings in combination with a nose rest or gage held in said bearing, substantially as described.

7. In a testing or trial frame, a temple-bar made of wire, a cell-frame also made of wire, having integral bearings for attachment to the temple-bar, and integral bearings for the adjusting-screws to which the cells are connected, substantially as described.

8. In a testing or trial frame a bar of wire bent to form two sets of bearings in combination with lens-cells and adjusting-screws therefor held in said bearings, substantially as described.

EMIL B. MEYROWITZ.

Witnesses:
 H. ALBERTUS WEST,
 G. DAVENPORT.